United States Patent
Hong et al.

(10) Patent No.: US 9,690,471 B2
(45) Date of Patent: Jun. 27, 2017

(54) MOBILE TERMINAL AND CONTROLLING METHOD THEREOF

(75) Inventors: Yeonchul Hong, Ansan-si (KR); Shinchul Kang, Seoul (KR); Seongrae Kim, Seoul (KR); Jaemoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 929 days.

(21) Appl. No.: 13/181,744

(22) Filed: Jul. 13, 2011

(65) Prior Publication Data
US 2012/0151400 A1    Jun. 14, 2012

(30) Foreign Application Priority Data

Dec. 8, 2010 (KR) .................. 10-2010-0124777

(51) Int. Cl.
*G06F 3/00* (2006.01)
*G06F 3/0488* (2013.01)
*G06F 3/0481* (2013.01)

(52) U.S. Cl.
CPC ........ *G06F 3/0488* (2013.01); *G06F 3/04817* (2013.01); *G06F 3/04886* (2013.01)

(58) Field of Classification Search
CPC ...... G06F 3/048; G06F 3/0484; G06F 3/0486; G06F 9/4443; G06F 3/0481–3/0489
USPC ...................................................... 715/769
See application file for complete search history.

(56) References Cited

U.S. PATENT DOCUMENTS

| | | | |
|---|---|---|---|
| 5,745,112 A * | 4/1998 | Hirose ...................... 715/769 |
| 5,940,488 A * | 8/1999 | DeGrazia ............ H04M 1/2473 |
| | | | 379/93.23 |
| 6,011,546 A * | 1/2000 | Bertram ............... H04N 21/443 |
| | | | 348/563 |
| 6,031,532 A * | 2/2000 | Gourdol ............. G06F 3/04817 |
| | | | 345/629 |
| 6,100,888 A * | 8/2000 | Gourdol ............. G06F 3/04817 |
| | | | 715/837 |
| 6,476,834 B1 * | 11/2002 | Doval .................. G06F 9/4443 |
| | | | 715/826 |
| 7,593,000 B1 * | 9/2009 | Chin ........................... 345/156 |
| 7,779,363 B2 | 8/2010 | Keohane et al. |

(Continued)

FOREIGN PATENT DOCUMENTS

| CN | 1790240 A | 6/2006 |
|---|---|---|
| CN | 1991750 A | 7/2007 |

(Continued)

*Primary Examiner* — Steven B Theriault
(74) *Attorney, Agent, or Firm* — Birch, Stewart, Kolasch & Birch, LLP

(57) ABSTRACT

A mobile terminal and controlling method thereof are disclosed, by which a user interface facilitating a setting of an additional function on an icon can be provided. One embodiment of the present invention includes a display unit, a user input unit configured to receive an input of a command from a user, and a controller generating a first attribute-giving icon corresponding to a first attribute on the display unit in accordance with a first input via the user input unit, the controller, if a distance between the first attribute-giving icon and a second icon displayed on the display unit is changed into a prescribed range in accordance with a second input via the user input unit, controlling the first attribute to be given to the second icon.

22 Claims, 17 Drawing Sheets

(56) References Cited

U.S. PATENT DOCUMENTS

| | | | | |
|---|---|---|---|---|
| 7,783,723 | B2* | 8/2010 | Peng | G06F 17/3089 455/411 |
| 7,865,845 | B2* | 1/2011 | Dettinger | G06F 3/0486 715/702 |
| 8,171,427 | B2* | 5/2012 | Chung | G06F 3/04817 715/765 |
| 8,365,099 | B2* | 1/2013 | Cho | G06F 3/0483 455/95 |
| 8,402,533 | B2* | 3/2013 | LeBeau | G06F 3/048 726/17 |
| 8,407,613 | B2* | 3/2013 | Hope | G06F 3/04817 715/764 |
| 8,423,911 | B2* | 4/2013 | Chaudhri | G06F 3/04817 715/765 |
| 8,572,653 | B2* | 10/2013 | Kim | G06F 3/0346 725/38 |
| 8,595,647 | B2* | 11/2013 | Sabin | G06F 3/0481 715/810 |
| 8,619,038 | B2* | 12/2013 | Chaudhri | G06F 3/04817 345/173 |
| 8,645,866 | B2* | 2/2014 | Nestler | G06F 3/04817 707/784 |
| 8,656,314 | B2* | 2/2014 | Locker | G06F 3/04883 345/173 |
| 8,698,845 | B2* | 4/2014 | Lemay | G06F 3/0488 345/158 |
| 8,762,886 | B2* | 6/2014 | Lietzke | G06F 3/04812 345/156 |
| 8,775,957 | B2* | 7/2014 | Kim | G06F 1/1626 345/619 |
| 8,793,606 | B2* | 7/2014 | Kim | G06F 3/04817 345/173 |
| 8,806,369 | B2* | 8/2014 | Khoe | G06F 3/0481 715/764 |
| 8,854,318 | B2* | 10/2014 | Borovsky | 345/156 |
| 8,881,060 | B2* | 11/2014 | Chaudhri | G06F 3/04817 715/748 |
| 8,887,079 | B2* | 11/2014 | Oh | G06F 3/04886 715/764 |
| 8,938,673 | B2* | 1/2015 | Lee | 715/273 |
| 8,938,677 | B2* | 1/2015 | Geppert | G06F 3/04817 348/14.08 |
| 2001/0042042 | A1* | 11/2001 | Stokes | G06Q 20/04 705/42 |
| 2002/0087579 | A1* | 7/2002 | Chasanoff et al. | 707/104.1 |
| 2002/0103933 | A1* | 8/2002 | Garon | G06F 17/30884 709/246 |
| 2003/0184587 | A1* | 10/2003 | Ording | G06F 3/04817 715/769 |
| 2004/0174400 | A1* | 9/2004 | Herigstad | G06F 3/0236 715/864 |
| 2004/0222975 | A1* | 11/2004 | Nakano | G06F 3/0482 345/173 |
| 2004/0250217 | A1* | 12/2004 | Tojo | G06F 3/0482 715/810 |
| 2005/0060653 | A1* | 3/2005 | Fukase | G06F 3/0486 715/724 |
| 2005/0246721 | A1* | 11/2005 | Scholz | G06Q 10/10 719/320 |
| 2005/0275636 | A1* | 12/2005 | Dehlin | G06F 3/011 345/173 |
| 2006/0070007 | A1* | 3/2006 | Cummins | G06F 17/30398 715/769 |
| 2006/0101498 | A1* | 5/2006 | Arling | H04N 21/84 725/81 |
| 2006/0129945 | A1 | 6/2006 | Dettinger et al. | |
| 2006/0218499 | A1* | 9/2006 | Matthews | G06F 17/30616 715/765 |
| 2006/0242122 | A1* | 10/2006 | DeVorchik et al. | 707/3 |
| 2006/0242590 | A1* | 10/2006 | Polivy | G06F 17/30905 715/760 |
| 2006/0288371 | A1* | 12/2006 | Jun | H04M 1/72522 725/52 |
| 2007/0016958 | A1* | 1/2007 | Bodepudi et al. | 726/27 |
| 2007/0094596 | A1* | 4/2007 | Nielsen | H04M 1/72544 715/700 |
| 2007/0150826 | A1* | 6/2007 | Anzures et al. | 715/772 |
| 2007/0150834 | A1* | 6/2007 | Muller | G06F 3/04817 715/810 |
| 2007/0198561 | A1* | 8/2007 | Lee | G06F 3/0483 |
| 2008/0040680 | A1* | 2/2008 | Lee | G06F 3/04815 715/764 |
| 2008/0146210 | A1* | 6/2008 | Somani | H04M 1/72522 455/418 |
| 2008/0148182 | A1* | 6/2008 | Chiang | G06F 3/0482 715/810 |
| 2008/0155481 | A1* | 6/2008 | Kim | G06F 3/0481 715/867 |
| 2008/0282196 | A1* | 11/2008 | Park | H04M 1/72544 715/838 |
| 2008/0313568 | A1* | 12/2008 | Park | G06F 3/04817 715/835 |
| 2009/0006991 | A1* | 1/2009 | Lindberg et al. | 715/763 |
| 2009/0013275 | A1* | 1/2009 | May | G06F 3/0483 715/765 |
| 2009/0019385 | A1* | 1/2009 | Khatib | G06F 9/4443 715/765 |
| 2009/0122018 | A1* | 5/2009 | Vymenets et al. | 345/173 |
| 2009/0144661 | A1* | 6/2009 | Nakajima | G06F 3/048 715/835 |
| 2009/0163193 | A1* | 6/2009 | Fyke | G06F 3/0482 455/418 |
| 2009/0227296 | A1* | 9/2009 | Kim | G06F 3/016 455/566 |
| 2009/0276701 | A1* | 11/2009 | Nurmi | G06F 3/0238 715/702 |
| 2009/0291676 | A1* | 11/2009 | Park | H04M 1/72522 455/418 |
| 2009/0313567 | A1* | 12/2009 | Kwon | G06F 3/0482 715/769 |
| 2010/0011310 | A1 | 1/2010 | Rainisto | |
| 2010/0058182 | A1* | 3/2010 | Jung | G06F 3/04883 715/702 |
| 2010/0077333 | A1* | 3/2010 | Yang | G06F 3/0486 715/769 |
| 2010/0083111 | A1* | 4/2010 | de los Reyes | G06F 3/0482 715/702 |
| 2010/0122194 | A1 | 5/2010 | Rogers | |
| 2010/0138763 | A1* | 6/2010 | Kim | G06F 1/1626 715/765 |
| 2010/0216448 | A1* | 8/2010 | Jeon | G06F 3/04817 455/418 |
| 2010/0251152 | A1 | 9/2010 | Cho et al. | |
| 2010/0257490 | A1* | 10/2010 | Lyon et al. | 715/863 |
| 2010/0269040 | A1* | 10/2010 | Lee | 715/702 |
| 2010/0289807 | A1* | 11/2010 | Yu et al. | 345/581 |
| 2010/0295789 | A1* | 11/2010 | Shin | G06F 1/1626 345/168 |
| 2010/0299598 | A1* | 11/2010 | Shin | G06F 3/0488 715/702 |
| 2011/0016025 | A1* | 1/2011 | Gaisford | G06Q 10/087 705/27.1 |
| 2011/0047231 | A1* | 2/2011 | Lim | G06F 17/30035 709/206 |
| 2011/0083105 | A1* | 4/2011 | Shin | G06F 17/24 715/830 |
| 2011/0087739 | A1* | 4/2011 | Lin | G06F 9/4443 709/206 |
| 2011/0087970 | A1* | 4/2011 | Swink et al. | 715/752 |
| 2011/0130170 | A1* | 6/2011 | Han | G06F 1/1694 455/566 |
| 2011/0225539 | A1* | 9/2011 | Lee | G06F 3/0485 715/784 |
| 2011/0246918 | A1* | 10/2011 | Henderson | G06F 3/04817 715/769 |
| 2011/0252375 | A1* | 10/2011 | Chaudhri | G06F 3/04817 715/835 |

(56) References Cited

U.S. PATENT DOCUMENTS

| | | | | |
|---|---|---|---|---|
| 2011/0252381 A1* | 10/2011 | Chaudhri | G06F 3/04883 | 715/838 |
| 2012/0046079 A1* | 2/2012 | Kim | H04M 1/72577 | 455/566 |
| 2012/0054663 A1* | 3/2012 | Baek | G06F 9/4443 | 715/772 |
| 2012/0071208 A1* | 3/2012 | Lee | H04M 1/72544 | 455/566 |
| 2012/0079432 A1* | 3/2012 | Lee | G06F 3/0483 | 715/838 |
| 2012/0088548 A1* | 4/2012 | Yun | G08C 17/02 | 455/557 |
| 2012/0110496 A1* | 5/2012 | Lee | G06F 3/0488 | 715/778 |
| 2012/0180001 A1* | 7/2012 | Griffin | G06F 3/04883 | 715/863 |
| 2012/0218192 A1* | 8/2012 | Lazaridis | G06F 1/1626 | 345/173 |
| 2012/0242599 A1* | 9/2012 | Seo | G06F 1/1641 | 345/173 |
| 2012/0260202 A1* | 10/2012 | Jiang | G06F 9/445 | 715/765 |
| 2012/0260218 A1* | 10/2012 | Bawel | G06F 3/04815 | 715/841 |
| 2012/0278757 A1* | 11/2012 | Shah | G06F 9/4443 | 715/790 |
| 2012/0284658 A1* | 11/2012 | Hirvonen | G06F 3/0488 | 715/779 |
| 2012/0304092 A1* | 11/2012 | Jarrett | G06F 9/4443 | 715/765 |
| 2012/0309463 A1* | 12/2012 | Lee | G06F 3/0482 | 455/566 |
| 2014/0229899 A1* | 8/2014 | Lee | G06F 3/0488 | 715/835 |

FOREIGN PATENT DOCUMENTS

| | | |
|---|---|---|
| CN | 101017498 A | 8/2007 |
| CN | 101763427 A | 6/2010 |
| KR | 10-2010-0114779 A | 10/2010 |

* cited by examiner (a)

(b)

(c)

(a) (b)

(c) (d)

(e)

(a)  (b)

(c)  (d)

(a)  (b)

(c)  (d)

(a)  (b)

(c)

(a) (b)

(c)

(a)  (b)

(c)  (d)

(a) (b)

(c) (d)

MOBILE TERMINAL AND CONTROLLING METHOD THEREOF

Pursuant to 35 U.S.C. §119(a), this application claims the benefit of earlier filing date and right of priority to Korean Patent Application No. 10-2010-0124777, filed on Dec. 8, 2010, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for providing a user interface that facilitates an additional function to be set on an icon.

Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and enhance functions of the terminal, the improvement of structural and/or software parts of the terminal can be taken into consideration.

Thus, since it is a recent trend to distribute a terminal that provides a user interface capable of selecting a menu or executing an application using an icon displayed on a display unit, the demand for a user interface capable of facilitating the manipulation of an icon basically provided by the terminal or an icon of an installed application is rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a user can be provided with a more convenient user interface of the mobile terminal.

Another object of the present invention is to provide a mobile terminal and controlling method thereof, by which at least one attribute can be freely set on or removed from a displayed icon.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit, a user input unit configured to receive an input of a command from a user, and a controller generating a first attribute-giving icon corresponding to a first attribute on the display unit in accordance with a first input via the user input unit, the controller, if a distance between the first attribute-giving icon and a second icon displayed on the display unit is changed into a prescribed range in accordance with a second input via the user input unit, controlling the first attribute to be given to the second icon.

In another aspect of the present invention, a method of controlling a mobile terminal includes the steps of generating a first attribute-giving icon corresponding to a first attribute on a display unit in accordance with a first input, changing a distance between the first attribute-giving icon and a second icon displayed on the display unit into a prescribed range in accordance with a second input, and giving the first attribute to the second icon.

Accordingly, the present invention provides the following effects and/or advantages.

First of all, the present invention facilitates at least one attribute to be freely set on or removed from a displayed icon.

Secondly, the present invention enables an attribute set on an icon to be displayed with at least one of various visual effects, thereby facilitating a user's recognition of the attribute set on the corresponding icon.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

Figure 5:
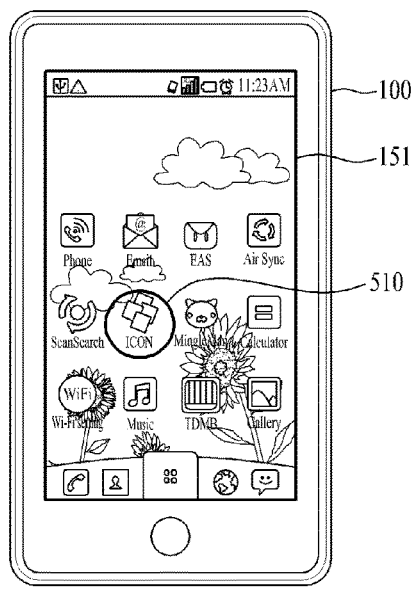
Figure 5:
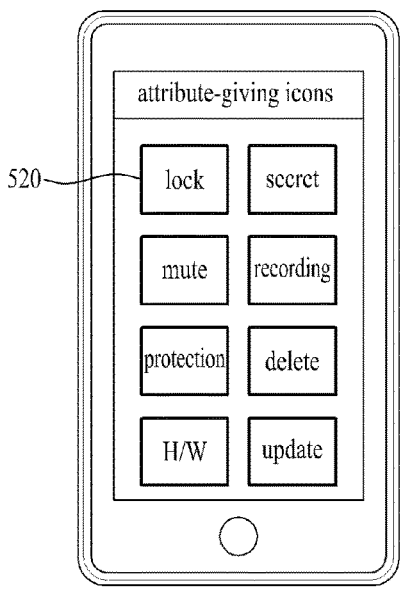
Figure 5:
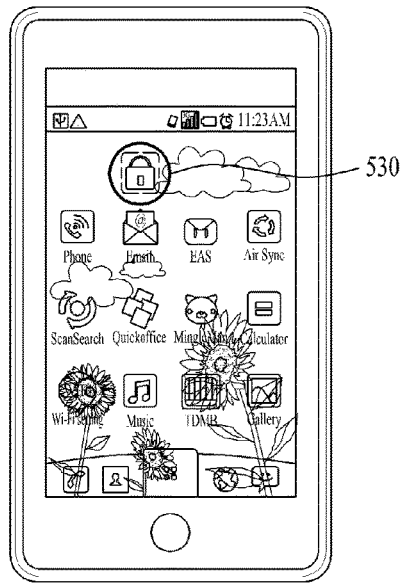
Figure 6:
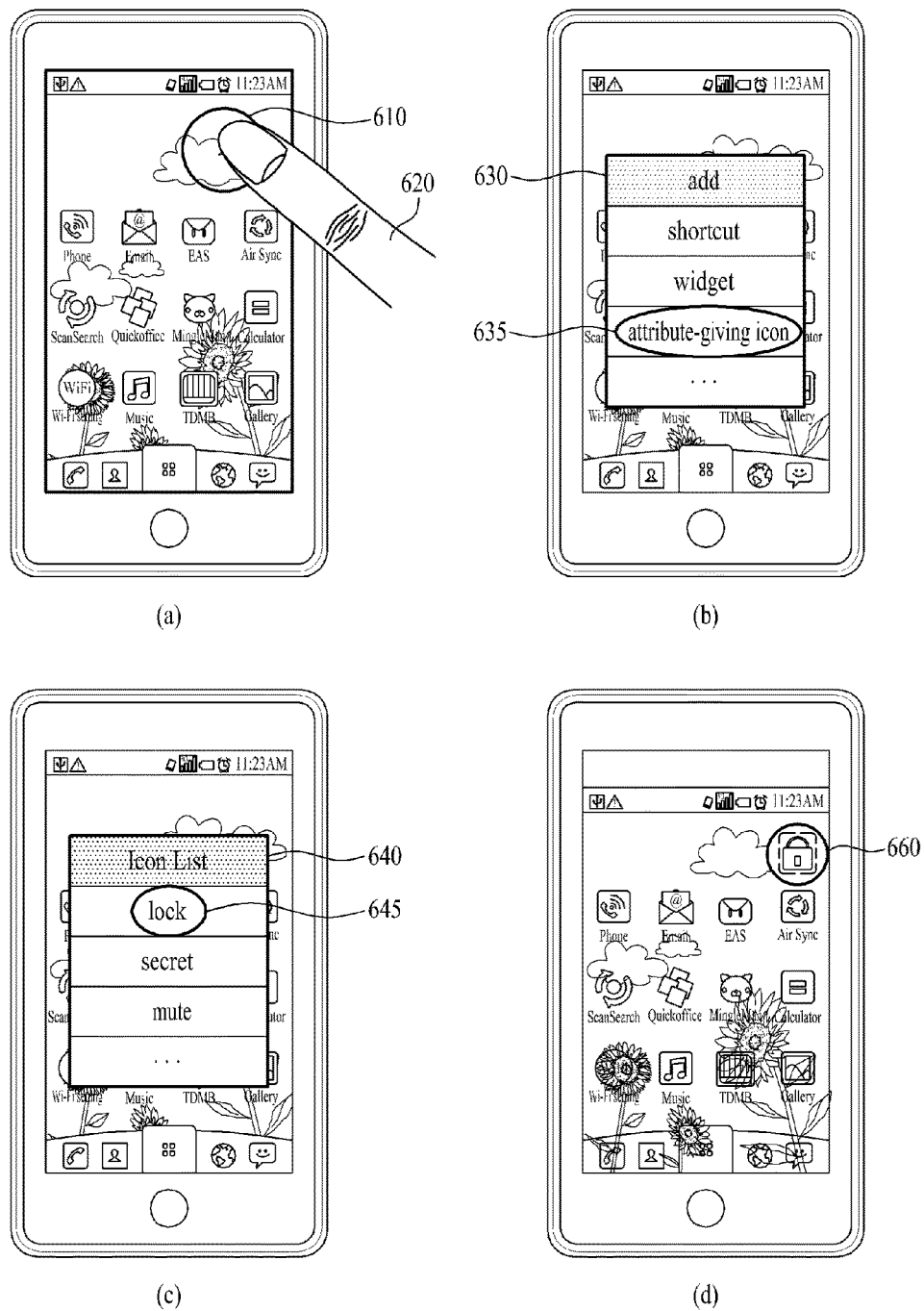
Figure 7:
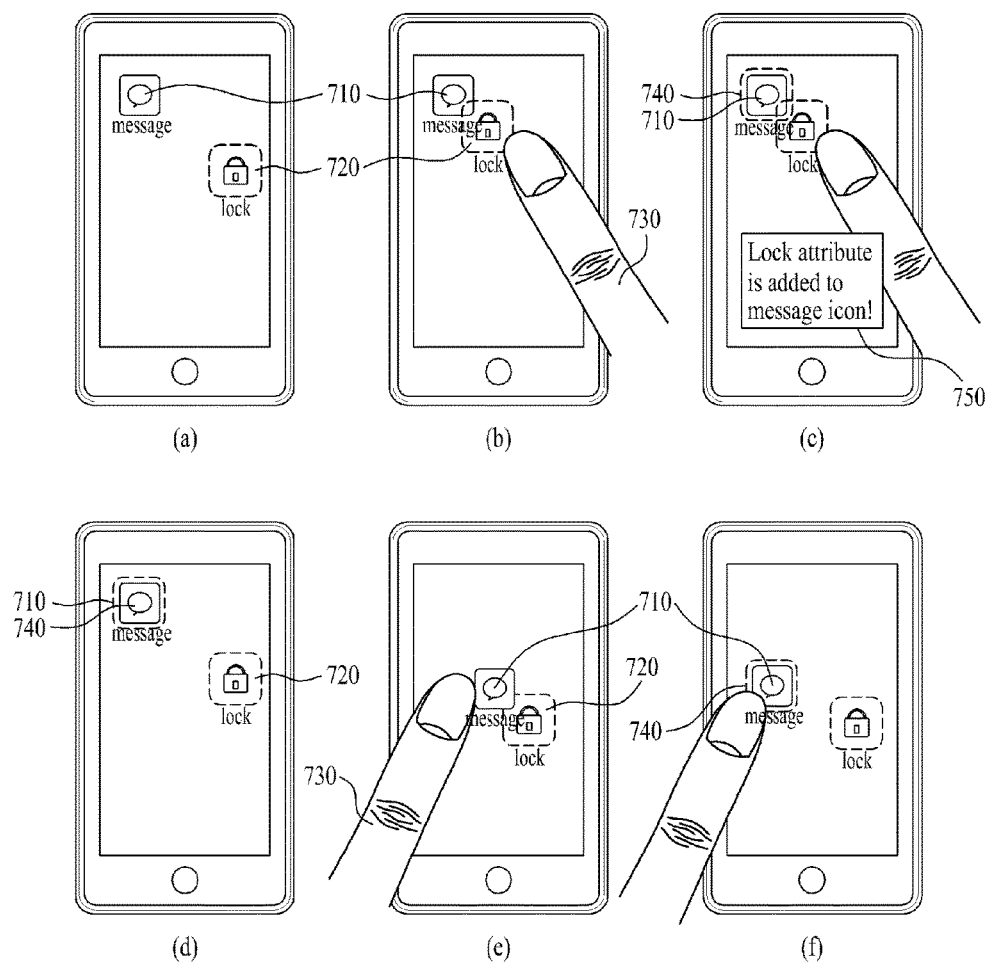
Figure 8:
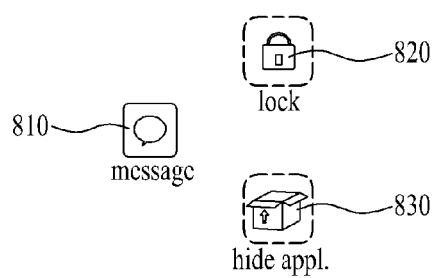
Figure 8:
Figure 8:
Figure 8:
Figure 8:
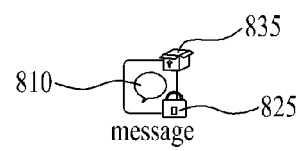
Figure 9:
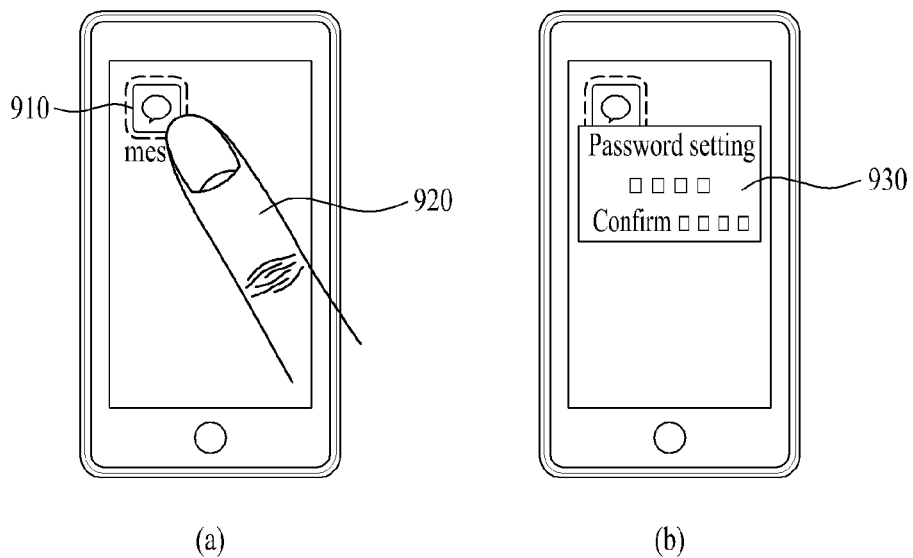
Figure 9:
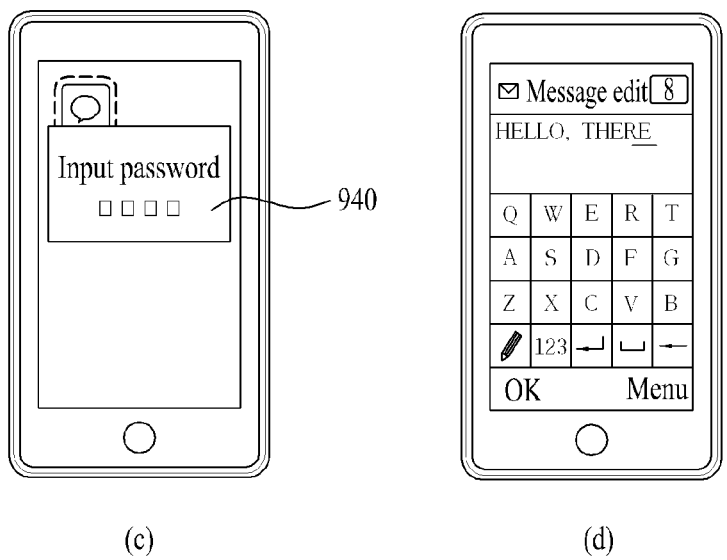
Figure 10:
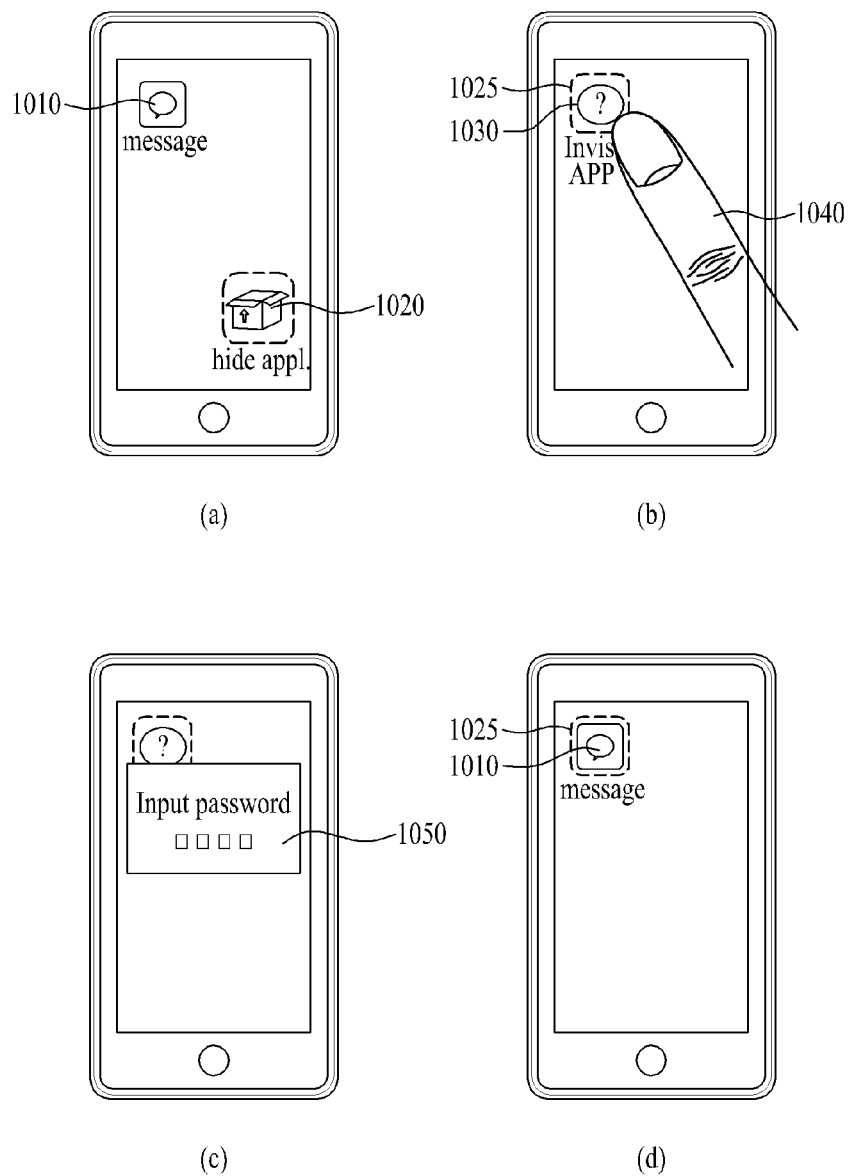
Figure 11:
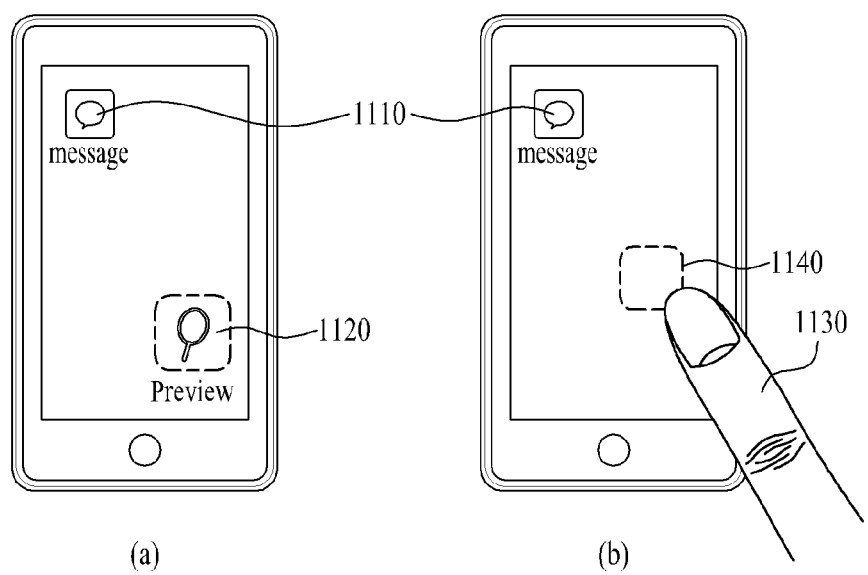
Figure 11:
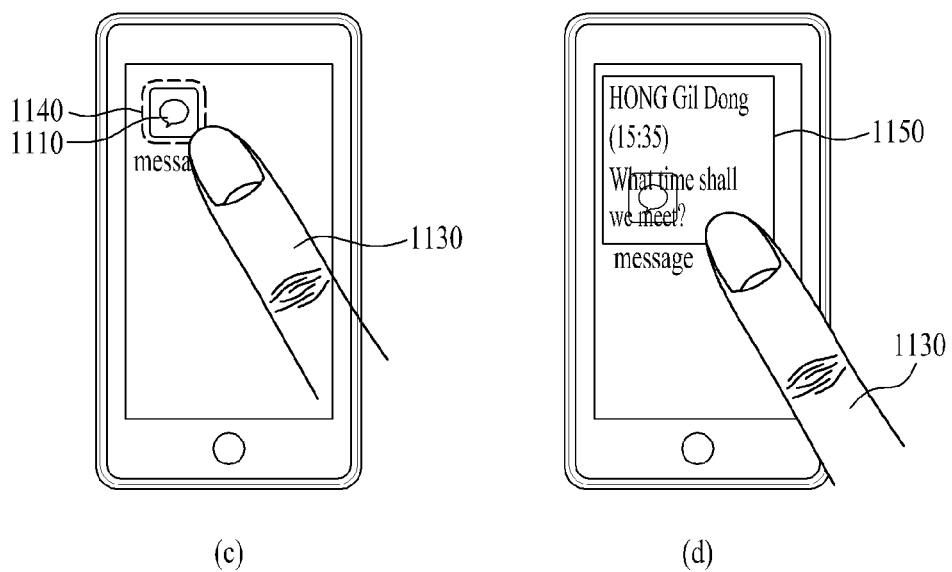
Figure 12:
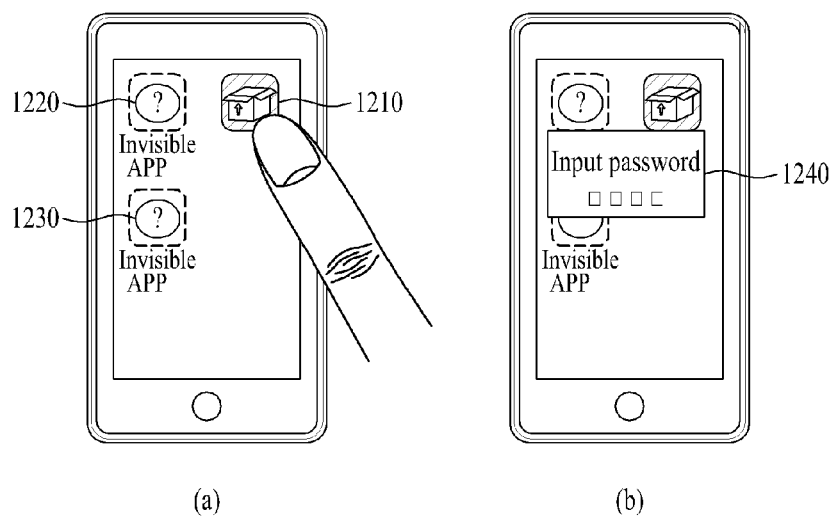
Figure 12:
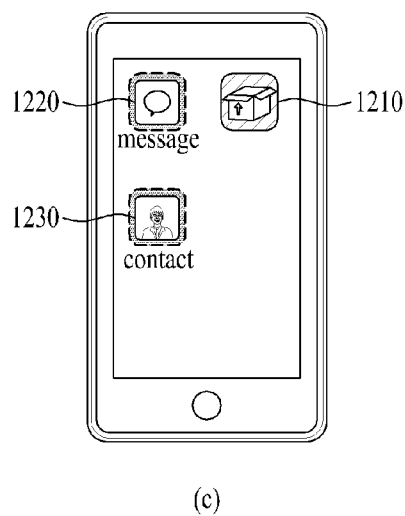
Figure 13:
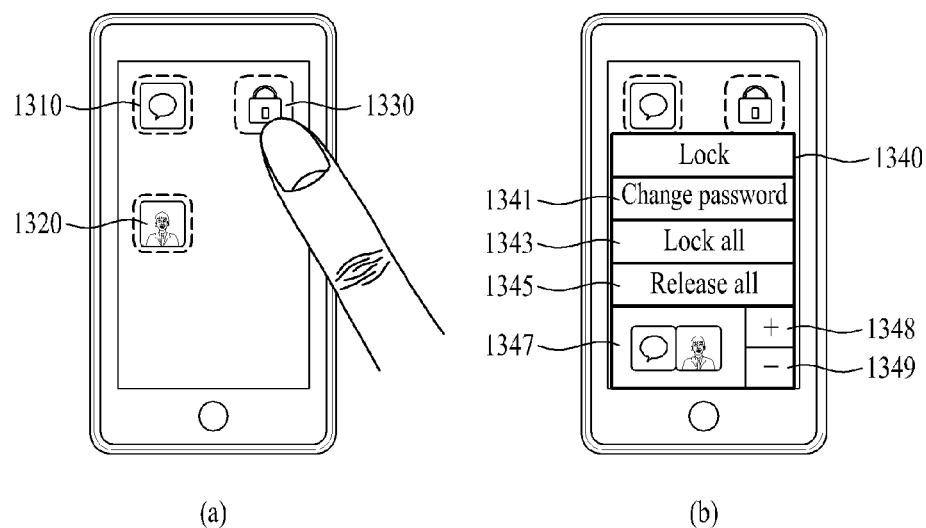
Figure 13:
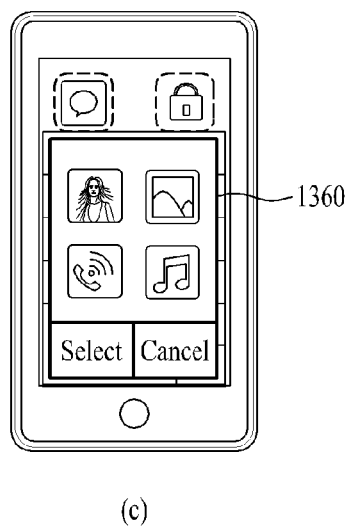
Figure 14:
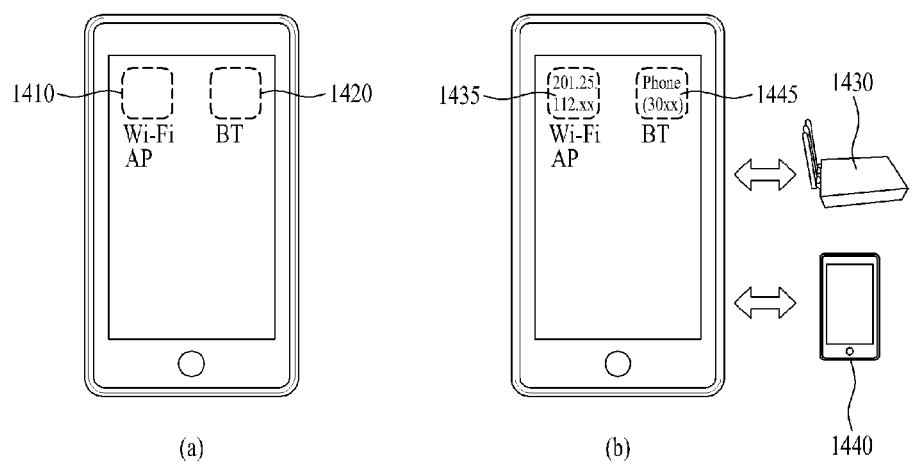
Figure 15:
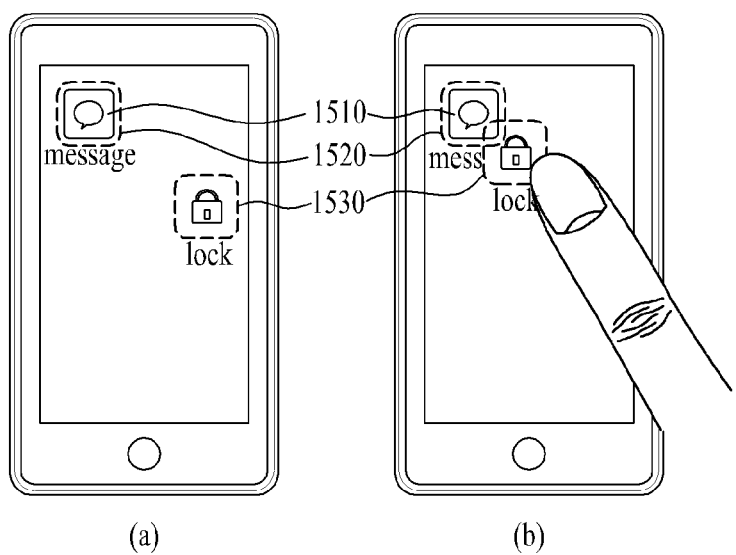
Figure 15:
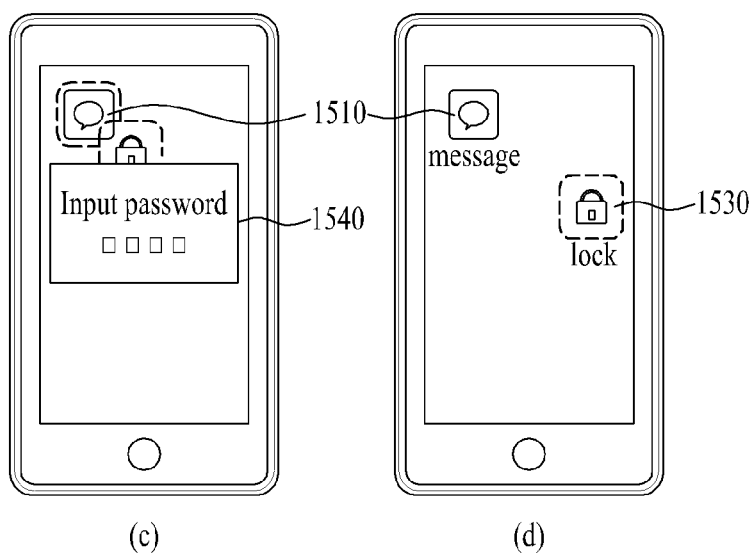
Figure 16:
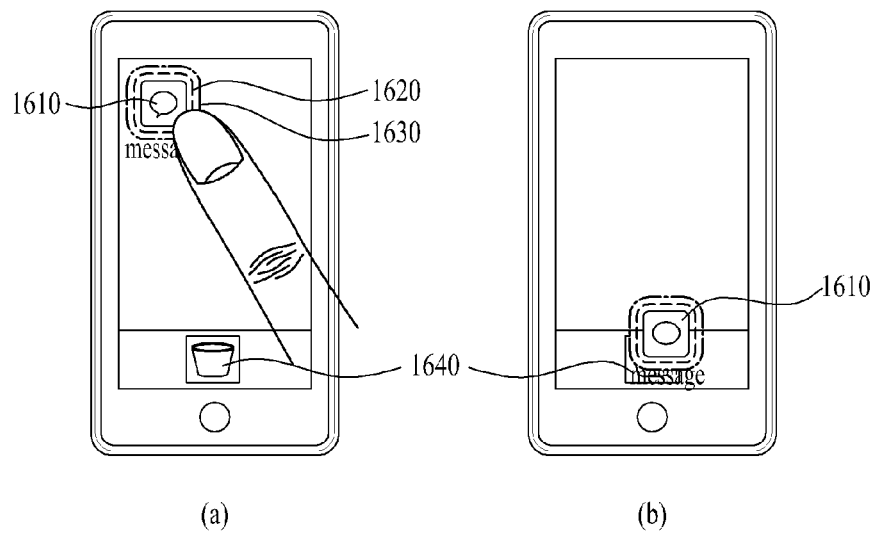
Figure 16:
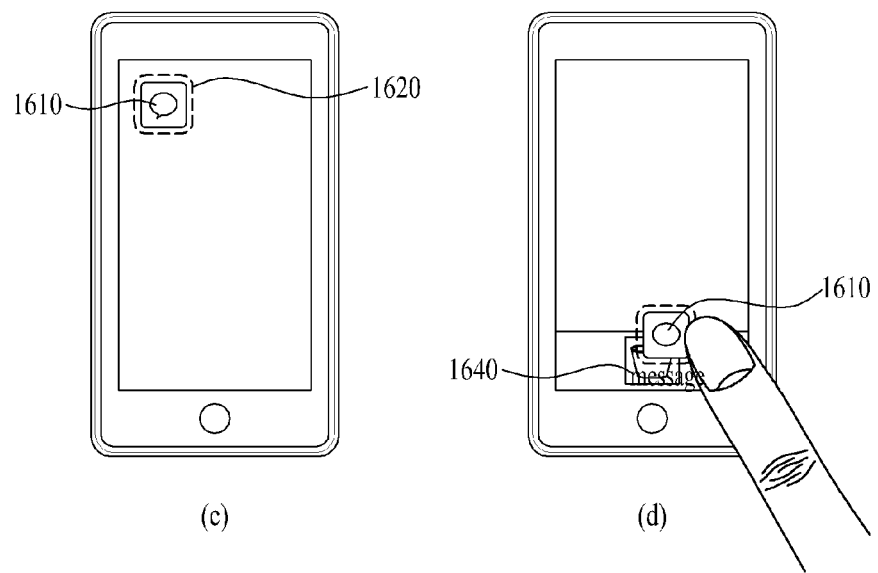
Figure 17:
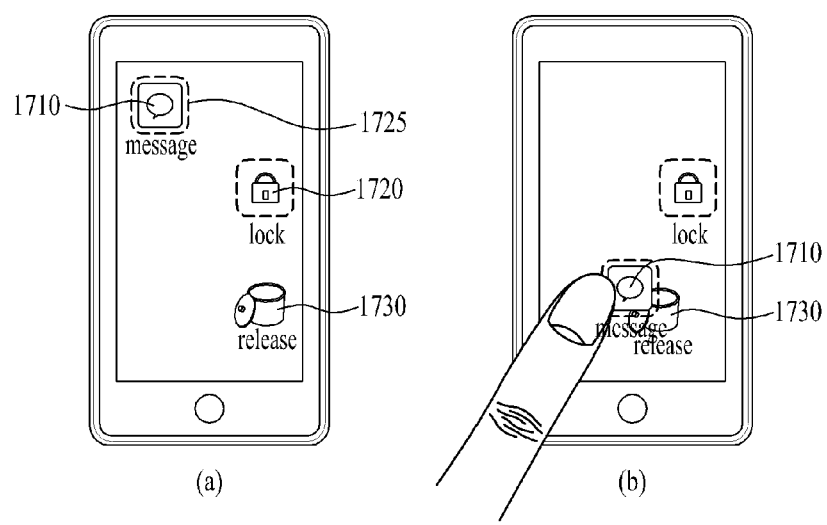
Figure 17:
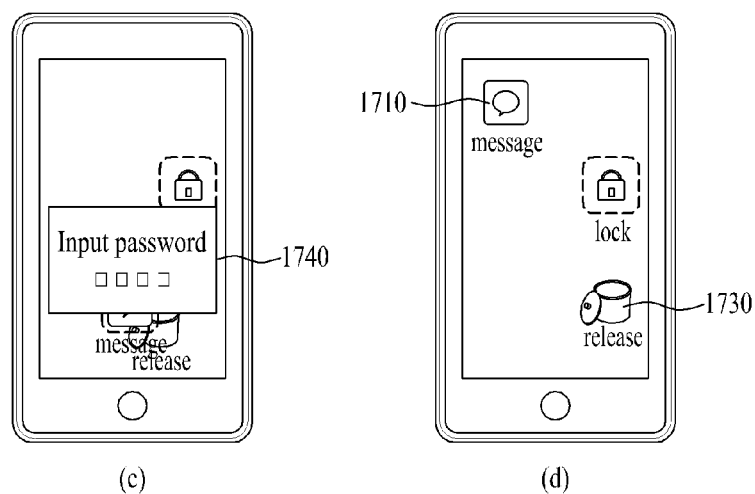

Items (a)-(c) of FIG. 5 are diagrams of display screen configurations for examples of a process for generating an attribute-giving icon in a mobile terminal according to one embodiment of the present invention;

Items (a)-(d) of FIG. 6 are diagrams of display screen configurations for examples of a process for generating an attribute-giving icon in a mobile terminal according to one embodiment of the present invention;

Items (a)-(f) of FIG. 7 are diagrams of display screen configurations for examples of showing how a target icon and an attribute-giving icon come in contact with each other in part at least in a mobile terminal according to one embodiment of the present invention;

Items (a)-(e) of FIG. 8 are diagrams of examples of a visual effect given to an attribute-given target icon in a mobile terminal according to one embodiment of the present invention;

Items (a)-(d) of FIG. 9 are diagrams of display screen configurations for describing a lock attribute according to one embodiment of the present invention;

Items (a)-(d) of FIG. 10 are diagrams of display screen configurations for describing a hide attribute according to one embodiment of the present invention;

Items (a)-(d) of FIG. 11 are diagrams of display screen configurations for describing a function of a preview attribute icon according to one embodiment of the present invention;

Items (a)-(c) of FIG. 12 are diagrams of display screen configurations for describing a function of a hide attribute icon according to one embodiment of the present invention;

Items (a)-(c) of FIG. 13 are diagrams of display screen configurations for describing a function of a lock attribute icon according to one embodiment of the present invention;

Items (a) and (b) of FIG. 14 are diagrams of display screen configurations for describing a function of a connect attribute icon according to one embodiment of the present invention;

Items (a)-(d) of FIG. 15 are diagrams of display screen configurations for examples of a method of removing a lock attribute given to a target icon using an attribute-giving icon of the lock attribute in a mobile terminal according to one embodiment of the present invention;

Items (a)-(d) of FIG. 16 are diagrams of display screen configurations for examples of a method of removing an attribute using a trash box according to one embodiment of the present invention; and Items (a)-(d) of FIG. 17 are diagrams of display screen configurations for examples of a method of removing an attribute given to a target icon using an icon having an attribute of attribute removal according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PAR) and navigators.

However, by way of non-limiting example only, further description will be with regard to a mobile terminal 100, and it should be noted that such teachings may apply equally to other types of terminals.

Figure 1:
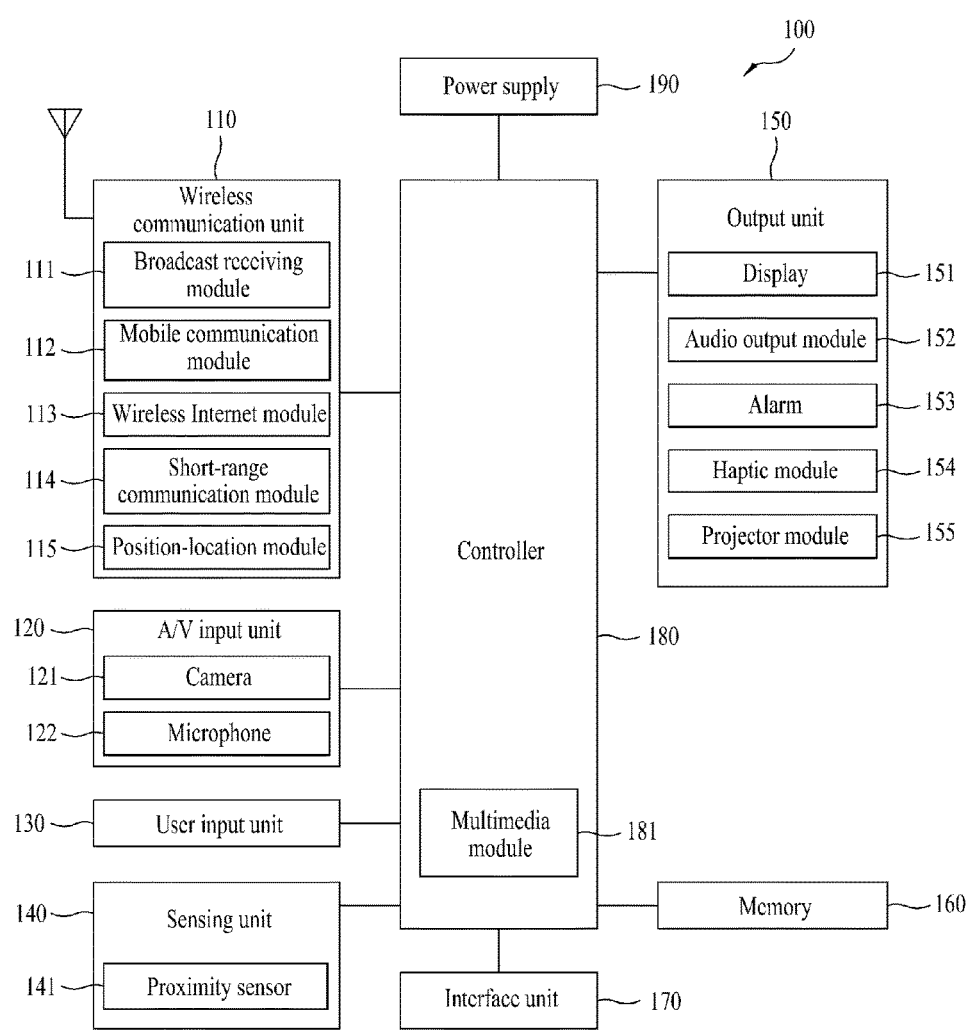
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message exchanges, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
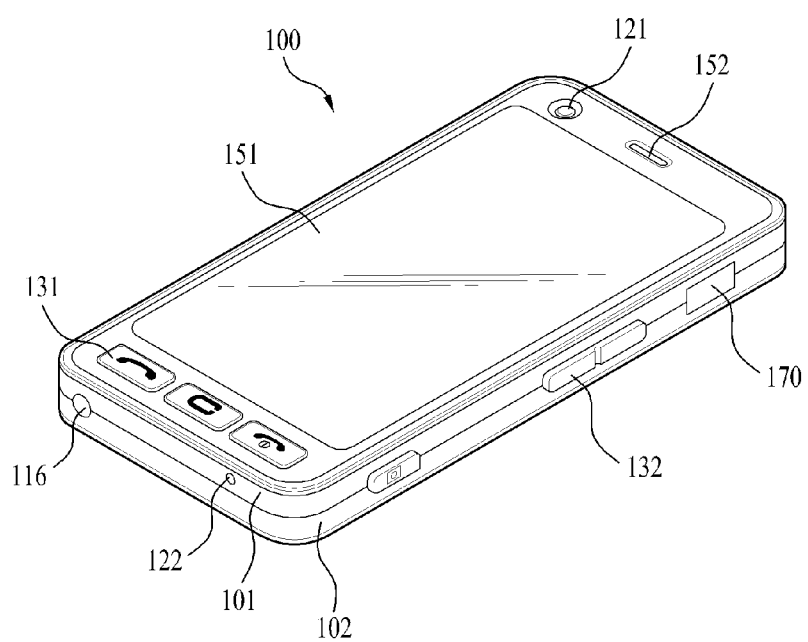
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Interconnected operational mechanism between the display 151 and the touchpad 135 are explained with reference to FIG. 3 as follows.

Figure 3:
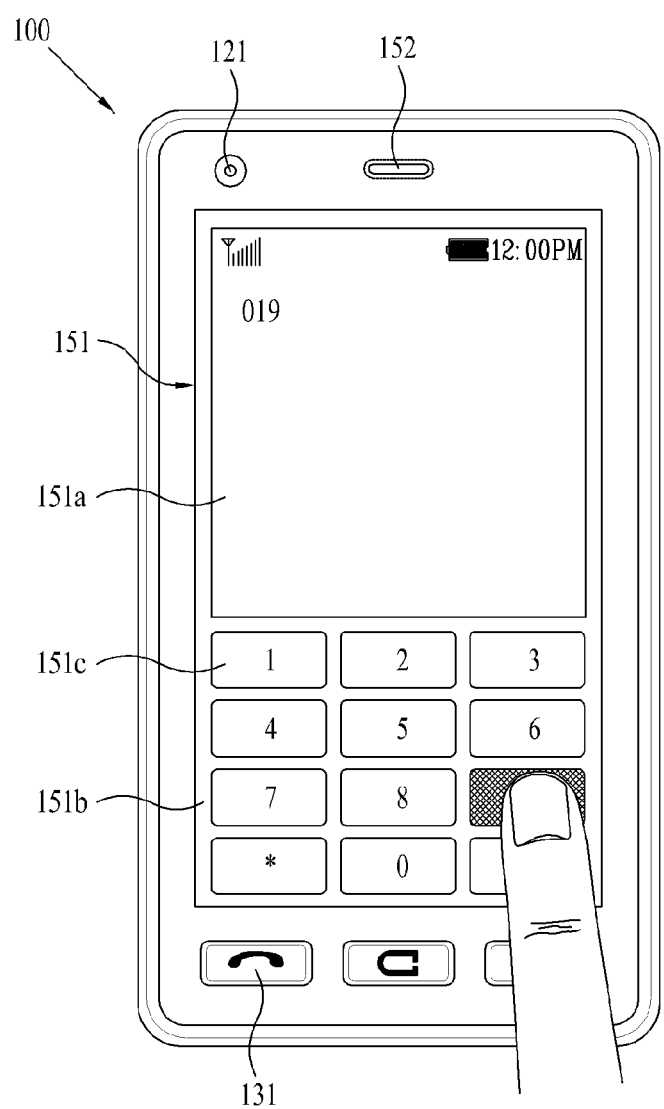
FIG. 3 is a front diagram of a mobile terminal according to one embodiment of the present invention to describe one operational status.

FIG. 3 is a front-view diagram of a terminal according to one embodiment of the present invention for explaining an operational state thereof.

First of all, various kinds of visual information can be displayed on the display 151. And, theses information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3 shows that a touch applied to a soft key is inputted through a front face of a terminal body.

The display 151 is operable through an entire area or by being divided into a plurality of regions. In the latter case, a plurality of the regions can be configured interoperable.

For instance, an output window 151a and an input window 151b are displayed on the display 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touch screen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

For clarity and convenience of the following description, a mobile terminal mentioned in the following description is assumed as including at least one of the components shown in FIG. 1. Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

Icon & Attribute/Function Given Thereto

In a general mobile terminal, in order for a user to change an attribute of an application, a widget or the like or set an additional attribute thereon, a corresponding menu is entered and a corresponding attribute is then set for each function.

In this case, the attribute (or property) indicates a property or characteristic of an icon or widget. For example of the attribute, there is a lock attribute for enabling an intrinsic operation to be performed with an input of a password, a mute attribute for substituting a sound effect with vibration or silence despite that an intrinsic operation supports the sound effect, a hide attribute for hiding an original shape of an icon, a protect attribute for preventing a random deletion or change conducted by a user, a background setting for an application to reside in a memory instead of being completely terminated despite that a command for terminating the corresponding application is given, or the like.

In due process, a user should pass through a plurality of complicated menu-to-submenu steps (hierarchical menu depth) in order to set a desired attribute. Thus, even if the change/addition of the setting on the attribute is performed, it is difficult for a user to be intuitively aware of the corresponding result. Moreover, the user should set and manage applications or widgets, to which the same attribute is applied, separately and is unable to set an attribute failing to be supported by the application itself.

According to embodiments of the present invention, in order to solve the above-mentioned problems, an apparatus and method of giving an attribute to an icon or widget universally irrespective of whether a specific attribute of an icon or widget corresponding to each application is supported are proposed.

In the following description of this disclosure, an icon indicating such a file as a multimedia content file, a document file, an execution/installation file and the like or an icon or widget for performing a shortcut function for a menu/application shall be represented as a common name 'icon'. And, assume that the display unit 151 of the mobile terminal according to the present invention includes a touchscreen.

Regarding the present invention according to the above definitions/assumptions, i.e., embodiments of the present invention, an attribute of an attribute-giving icon is given to a target icon in a manner that an icon (for clarity, hereinafter named 'attribute-giving icon') for giving an attribute to a general icon is brought into contact with or combined with an icon (for clarity, hereinafter named 'target icon') becoming a target of the attribute giving. This process is represented as a flowchart shown in FIG. 4.

Figure 4:
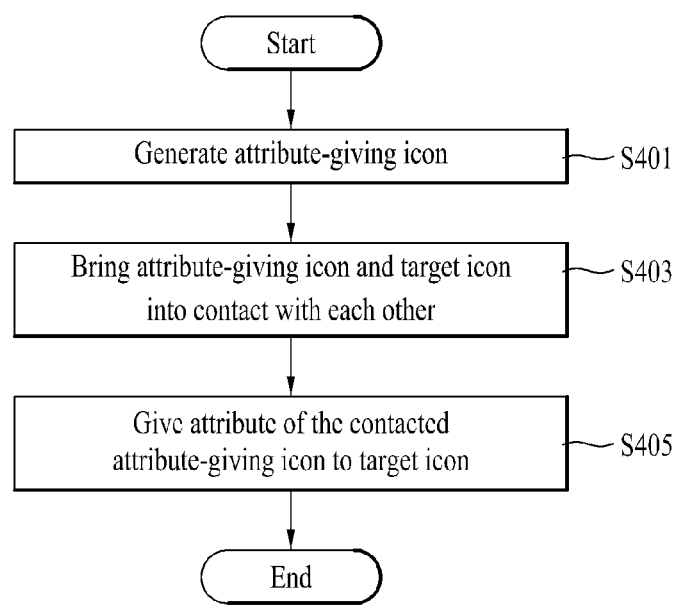
FIG. 4 is a flowchart for one example of a procedure for giving an attribute of an attribute-giving icon to a target icon in a mobile terminal according to one embodiment of the present invention.

FIG. 4 is a flowchart for one example of a procedure for giving an attribute of an attribute-giving icon to a target icon in a mobile terminal according to one embodiment of the present invention.

Referring to FIG. 4, the controller 180 generates an attribute-giving icon in accordance with a prescribed input via the user input unit 130 [S401].

In this case, it is able to generate the attribute-giving icon through a menu manipulation for the attribute-giving icon generation provided to have a prescribed menu depth on a main menu or a menu manipulation for generating a new object on a home screen (e.g., a background screen, a standby screen, a basic screen, etc.). Moreover, the generated attribute-giving icon can be displayed on an empty space of the screen or at a prescribed position of a file browser, which shall be described in detail with reference to FIG. 5 and FIG. 6 later in this disclosure.

After the attribute-giving icon has been generated, a target icon, which is a target for setting an attribute of the attribute-giving icon, is selected [S403].

In doing so, the selection of the target icon can be made in a manner that an icon partially brought into contact with the attribute-giving icon becomes the target icon.

For instance, the target icon is dragged to come into contact with the attribute-giving icon in part at least by inputting a touch & drag. On the contrary, the attribute-giving icon is dragged to the target icon to be overlapped with each other in part at least. The corresponding touch & drag shall be described in detail with reference to FIG. 7 later in this disclosure.

Alternatively, although the target icon and the attribute-giving icon are not brought into contact with each other, if a distance between the two icons is changed to enter a range of a predetermined distance, the target icon can be selected. For example, at least one of the two icons may be moved to within a predetermined distance of the other icon. Or, the attribute of the attribute-giving icon may be transferred to the target icon by a predetermined sequence of touches to the two icons (e.g., one or more touches to the attribute-giving icon followed by one or more touches to the target icon, or vice versa). Or, the attribute of the attribute-giving icon may be transferred to the target icon by another operation on the touchscreen (e.g., drawing a trace completely or partially around the attribute-giving icon with a pointer followed by a drag of the pointer to the target icon). Or, the attribute may be give to the target icon by way of a sustained touch simultaneously applied to the attribute-giving icon and the target icon, or via another sequence of sustained touches.

Once the target icon is selected (e.g., if the target icon and the attribute-giving icon are brought into contact with each other in part at least), the controller 180 controls an attribute of the attribute-giving icon to be given to the target icon. In doing so, the controller 180 is able to control a prescribed visual effect, which indicates the corresponding attribute, to be given to the target icon [S405].

Thereafter, if a user selects the target icon, the controller 180 preferentially determines the given attribute prior to performing an original operation set on the target icon and then performs an operation in accordance with the determined attribute. For instance, if a message icon having a lock attribute given thereto is selected by a user, the controller 180 determines whether a condition for unlock is met. Only if the corresponding condition is met, the controller 180 executes or displayed a message application.

Generation of Attribute-Giving Icon

In the following description, a method of generating the above-described attribute-giving icon is explained in detail with reference to FIG. 5 and FIG. 6.

In the diagrams of the screen configurations shown in the following drawings including FIG. 5, assume that a process for adding, changing or canceling an attribute of a target icon is performed on a home screen, by which the present invention is non-limited. And, it is apparent to those skilled in the art that a process for adding, changing or canceling an attribute of a target icon can be performed in various situations.

FIG. 5 is a diagram of display screen configurations for one example of a process for generating an attribute-giving icon in a mobile terminal according to one embodiment of the present invention.

Referring to FIG. 5, it is able to select an icon 510 providing a shortcut function of going directly to a menu for generating an attribute-giving icon on a home screen (e.g., background screen, wallpaper, etc.) displayed on the touchscreen 151 of the mobile terminal 100 [FIG. 5 (a)]. And, a menu for generating an attribute-giving icon is displayed on the touchscreen [FIG. 5 (b)]. If a lock attribute 520 is selected, an attribute-giving icon 530 having a lock attribute can be generated from an empty region of the home screen [FIG. 5 (c)].

FIG. 6 is a diagram of display screen configurations for one example of a process for generating an attribute-giving icon in a mobile terminal according to one embodiment of the present invention.

Referring to FIG. 6, a user is able to page a menu window 630 for generating an object on a home screen in a manner of selecting an empty region of the home screen (e.g., a touch, a long touch, etc.) [FIG. 6 (a) and FIG. 6 (b)]. If the user selects an attribute-giving icon generating menu from the menu window 620, a list 640 of selectable attribute-giving icons is displayed [FIG. 6 (c)]. If an attribute-giving icon 645 for giving a lock attribute is selected from the list 640, an attribute-giving icon 660 of the lock attribute can be generated from an empty region of the home screen [FIG. 6 (d)].

Optionally, an attribute-giving icon having an attribute fail to be designated thereto is generated by a prescribed menu manipulation and the generated attribute-giving icon is then selected to determine an attribute of the corresponding attribute-giving icon.

Giving Attribute of Attribute-Giving Icon to Target Icon

In the following description, a method of giving an attribute to a target icon is explained with reference to FIG. 7.

FIG. 7 is a diagram of display screen configurations for one example of showing how a target icon and an attribute-giving icon come in contact with each other in part at least in a mobile terminal according to one embodiment of the present invention.

First of all, for the clear understanding of the display screen configurations shown in the following diagrams including FIG. 7, icons failing to participate in a process for giving an attribute to a target icon, a process for changing an attribute given to a target icon, or a process for canceling an icon from a target icon according to embodiments of the present invention are not shown. In particular, it is apparent to those skilled in the art that embodiments of the present invention can apply to icons more or less than icons shown in the display screen configuration diagrams.

In FIG. 7, assume a case that a user attempts to give a lock attribute to a message icon. In particular, assume that a message icon is a target icon in FIG. 7.

Referring to FIG. 7, while a message icon 710 is displayed on a home screen, an attribute-giving icon 720 of a lock attribute can be generated by one of the above-mentioned methods [FIG. 7 (a)].

A user enables the attribute-giving icon 720 to be brought into contact with the message icon 710 in part at least by dragging the attribute-giving icon 720 with a pointer 730 [FIG. 7 (b)]. In doing so, an action for switching to a drag-enabling state can be preceded in order to drag an icon on the home screen. For example of this action, there is a long touch performed on an icon that becomes a target of the drag.

Subsequently, an outline 740 can be displayed as a visual effect, which indicates that a lock attribute is given, around the message icon 710 [FIG. 7 (c)]. And, a message 750, which announces that the lock attribute is given to the message icon 710, can be displayed on the touchscreen. Moreover, an audio output or a vibration of a prescribed pattern can be generated simultaneously with or on behalf of the announcement message 750. Thereafter, a user is able to drag the attribute-giving icon 720 to return to its original position [FIG. 7D]. Alternatively, if the drag touch is canceled, the attribute-giving icon 720 can return to its original position automatically. Alternatively, the attribute-giving icon can be set to disappear by a 1-time contact.

Moreover, whether the attribute-giving icon will disappear can be determined in accordance with a duration of the contact with a target icon. For instance, if the duration of the contact with the target icon is less than 1 second, the attribute-giving icon is set to disappear. If the duration of the contact with the target icon is equal to longer than 1 second, the attribute-giving icon can be set to not to disappear. Optionally, the time and condition for the disappearance can be set in various ways.

Meanwhile, in order to give an attribute to a target icon, the target icon can be shifted to become into contact with an attribute-giving icon. In particular, if a message icon 710 is dragged to be brought into contact with an attribute-giving icon 720 [FIG. 7 (e)], an attribute can be given to the message icon 719 [FIG. 7 (f)]. In this case, whether the attribute-giving icon will disappear can be determined in the above-mentioned manner.

Although FIG. 7 shows that edges of the icons are brought into contact with each other in part, an attribute can be given to a target icon only if the icons are brought into contact with each other over a predetermined rate or entirely.

Display Forms of Attribute-Given Target Icons

In the following description, detailed forms of displaying a target icon having an attribute given thereto are explained with reference to FIG. 8.

FIG. 8 is a diagram of examples of a visual effect given to an attribute-given target icon in a mobile terminal according to one embodiment of the present invention.

Referring to FIG. 8, a message icon 810, an attribute-giving icon 820 for giving a lock attribute and an attribute-giving icon 830 for giving a hide attribute are prepared as target icons [FIG. 8 (a)].

If the lock attribute is given to the message icon 810, an outline 823 can be displayed around the message icon 810 [FIG. 8 (b)]. Alternatively, a mini icon 825, which indicates a lock attribute, can be displayed on a prescribed region of the message icon 810 [FIG. 8 (c)].

Meanwhile, a plurality of attributes can be given to a target icon according to the present embodiment. For instance, in case that both a lock attribute and a hide attribute are given, an outline 823 according to the lock attribute and an outline 833 according to the hide attribute can be displayed around the message icon 810 together [FIG. 8 (d)]. In this case, each of the outlines is preferably given to differ in color, thickness, shape (e.g., a broken line, a doted line, etc.) or the like in accordance with the corresponding attribute. Alternatively, a mini icon 835 according to the lock attribute and a mini icon 835 according to the hide attribute can be displayed on a prescribed region of the message icon 810.

Effect Attributed to Giving Attribute

In the following description, functions attributed to various attributes given to a target icon according to the present embodiment are explained with reference to FIG. 9 and FIG. 10.

FIG. 9 is a diagram of display screen configurations for describing a lock attribute according to one embodiment of the present invention.

Referring to FIG. 9, assume that an original function of a message icon is a function of a shortcut to a message edit mode (SMS-editor application).

First of all, a message icon 910 having a lock attribute given thereto can be selected via a pointer 920 [FIG. 9 (a)]. When the lock attribute is given, if a password is not set in advance, a password setting window 930 can be displayed [FIG. 9 (b)]. After the password has been set, the message icon 910 is selected, a password input window 940 can be displayed [FIG. 9 (c)]. Only if the password is correctly inputted, the message edit mode corresponding to the original function of the message icon can be entered [FIG. 9 (d)].

FIG. 10 is a diagram of display screen configurations for describing a hide attribute according to one embodiment of the present invention.

Referring to FIG. 10, in order to give a hide attribute to a message icon 1010, an attribute-giving icon 1020 for giving the hide attribute can be generated [FIG. 10 (a)]. As the hide attribute of the attribute-giving icon 1020 is given to the message icon 1010 by one of the aforesaid methods, the message icon 1010 is changed into a hide icon 1030 differing in shape and name and an outline 1025 corresponding to the hide attribute can be displayed around the hide icon 1030 [FIG. 10 (b)]. Afterwards, if the hide icon 1030 is selected via a pointer 1040, a password input window 1050 is displayed [FIG. 10 (c)]. Only if a password is correctly inputted, the hide icon 1030 is displayed as the original message icon 1010 [FIG. 10 (d)]. Yet, in this case, the outline 1025 indicating that hide attribute can keep being displayed. Thereafter, if the message icon is selected once or a predetermined period of time goes by, the message icon can be changed in to the hide icon 1030 again.

In addition to the aforesaid lock and hide attributes, a mute attribute for substituting a vibration or silence despite an audio effect supported by an original operation, a protection attribute for preventing a random deletion or change by a user, a background attribute for enabling an application to reside as a background in a memory instead of being terminated despite giving an order of termination to the corresponding application, an auto update activate/deactivate attribute, a recording attribute for recording and/or capturing an executed state of a corresponding application and the like can be set and executed according to an embodiment of the present invention.

The above-described attributes are exemplary. And, the present invention is non-limited by the above-described attributes. For example, the present invention can apply to any attribute capable of adding/changing/canceling a function/operation or an executed state of an application or widget.

Self-Function of Attribute-Giving Icon

Meanwhile, an attribute-giving icon according to the present invention is able to perform an independent function of its own as well as a function of giving an attribute to a target icon. This is described with reference to FIGS. 11 to 14 as follows.

First of all, one example of performing a function corresponding to an attribute via an attribute-giving icon is explained with reference to FIG. 11 as follows.

FIG. 11 is a diagram of display screen configurations for describing a function of a preview attribute icon according to one embodiment of the present invention.

Referring to FIG. 11, a message icon 1110 and a preview attribute-giving icon 1120 are displayed on a home screen [FIG. 11 (a)]. In this case, if a preview attribute is applied to a target icon, a preview attribute means an attribute that enables some of data of an application corresponding to the corresponding icon to be displayed.

After the preview attribute-giving icon 1120 is selected via a pointer 1130 to enter a state of being dragged, an outline 1140 can remain on the home screen only [FIG. 11 (b)]. After the outline 1140 has been brought into contact with the message icon 1110, if the contact state is maintained over a predetermined period of time, the outline 1140 is changed into an extended outline 1150 extended to be suitable for a preview so that a portion of a message content can be displayed as a preview form [FIG. 11 (d)].

In the following description, one example of setting/canceling target icons, to which corresponding attributes are given, collectively, is described with reference to FIG. 12.

FIG. 12 is a diagram of display screen configurations for describing a function of a hide attribute icon according to one embodiment of the present invention.

Referring to FIG. 12, an attribute-giving icon 1210 associated with a hide attribute and two or more hide attribute applied icons 1220 and 1230 are prepared on a home screen [FIG. 12 (a)]. If a user selects the attribute-giving icon 1210, a password input window 1240 for canceling the hide attribute is displayed [FIG. 12 (b)]. If a password is correctly inputted, both of the hide-attribute applied icons 1220 and 1230 are released from the hide effect and can be then displayed as the original icon forms [FIG. 12 (c)]. If a password is not correctly inputted, both of the hide-attribute applied icons 1220 and 1230 are not released from the hide effect and thus remain hidden.

In the following description, one example of changing an overall set state of a corresponding attribute is explained with reference to FIG. 13.

FIG. 13 is a diagram of display screen configurations for describing a function of a lock attribute icon according to one embodiment of the present invention.

Referring to FIG. 13, a message icon 1310 having a lock attribute set thereon, a contact icon 1320 having a lock attribute set thereon and an attribute-giving icon 1330 of a lock attribute are prepared on a home screen [FIG. 13 (*a*)]. If a user selects the attribute-giving icon 1330, a lock attribute setting window 1340 is displayed [FIG. 13 (*b*)]. On the setting window 1340, a menu 1341 for changing a lock password, a menu 1343 for setting a lock attribute on al icons, a menu 1345 for releasing the all icons from the lock attribute, an icon list currently having the lock attribute set thereon, a menu 1348 for adding an icon to give an attribute, a menu 1349 for releasing an attribute-giving icon from a corresponding attribute and the like can be displayed. If the user selects the menu 1348 for adding an icon for giving an attribute, a list 1360 for giving a lock attribute without having the lock attribute given thereto currently can be displayed [FIG. 13 (*c*)].

In the following description, one example of displaying a state of an attribute within an attribute-giving icon is explained with reference to FIG. 14.

FIG. 14 is a diagram of display screen configurations for describing a function of a connect attribute icon according to one embodiment of the present invention.

Referring to FIG. 14, a wireless LAN attribute icon 1410 and a Bluetooth attribute icon 1420 are displayed on a home screen [FIG. 14 (*a*)]. If a connectible wireless sharer 1430 is detected, information on the corresponding sharer 1430 can be displayed within the wireless LAN attribute icon 1410. If an external device 1440 possible to be paired by Bluetooth is detected, information of the corresponding device 1440 can be displayed within the Bluetooth attribute icon 1420. While the information on the connectible device is displayed, if the corresponding attribute icon is selected, a set/release function of a connection to the corresponding device can be executed.

Release from Given Attribute

In the following description, a method of releasing an attribute-given icon from a corresponding attribute is explained with reference to FIGS. 15 to 17.

First of all, a method of releasing an icon from an attribute given thereto using an attribute-giving icon is explained with reference to FIG. 15.

FIG. 15 is a diagram of display screen configurations for one example of a method of releasing a target icon from a lock attribute given thereto using an attribute-giving icon of the lock attribute in a mobile terminal according to one embodiment of the present invention.

Referring to FIG. 15, a message icon 1510 having a visual effect 1520 given thereto by receiving a lock attribute and an attribute-giving icon 1530 of a lock attribute are displayed on a home screen [FIG. 15 (*a*)]. If the attribute-giving icon 1530 is brought into contact with the message icon 1510 [FIG. 15 (*b*)], a password input window 1540 of the lock screen is displayed [FIG. 15 (*c*)]. If a password is correctly inputted, the message icon 1510 can be released from the lock attribute [FIG. 15 (*d*)]. If an attribute needs no confirmation of the password, such a step shown in FIG. 15 (*d*) can be skipped.

In the following description, a general method of deleting an icon from a home screen (e.g., a method of using a trash box) is usable for an attribute removal. This is described with reference to FIG. 16 as follows.

FIG. 16 is a diagram of display screen configurations for one example of a method of removing an attribute using a trash box according to one embodiment of the present invention.

Referring to FIG. 16 (*a*), a message icon 1610 accompanied by a pair of different kinds of outlines 1620 and 1630 in a manner of receiving two kinds of attributes is displayed on a home screen. If a touch input of a specific pattern (e.g., a long touch) is applied to the message icon 1610, the message icon 1610 enters a mode of being movable as soon as a trash box 1640 for an icon removal is displayed on a bottom part of the home screen.

Thereafter, if the message icon 1610 is dragged & dropped to the trash box 1640, the message icon 1610 can be released from the attribute corresponding to the outer outline instead of being deleted [FIG. 16 (*b*)]. Accordingly, referring to FIG. 16 (*c*), as the message icon 1610 is released from the attribute corresponding to the outer outline 1630, the outer outline 1630 disappears but the inner outline 1610 remains only on the home screen. If the message icon 1610 is dragged & dropped to the trash box 1640 again, the other attribute corresponding to the inner outline 1610 is removed as well.

Alternatively, all the attributes given to a corresponding icon can be set to be removed by performing a single drag & drop to a trash box. Optionally, in case that such a procedure as a password confirmation is requested for the attribute release, a menu window for confirming a password can be displayed in case of the drop to the trash box.

Meanwhile, it is able to use an icon having an attribute of an attribute removal or release. This is described with reference to FIG. 17 as follows.

FIG. 17 is a diagram of display screen configurations for one example of a method of removing an attribute given to a target icon using an icon having an attribute of attribute removal according to one embodiment of the present invention.

Referring to FIG. 17 (*a*), as a lock attribute is given to a message icon 1710 by an attribute-giving icon 1720, an outline 1725 corresponding to the lock attribute is displayed. In doing so, an attribute-removing icon 1730 having an attribute of an attribute removal can be generated by one of the former methods for generating the attribute-giving icon.

In order to release the message icon 1710 from the lock attribute, a user is able to bring the message icon 1710 into contact with the attribute-removing icon 1730 by a drag [FIG. 17 (*b*)]. Accordingly, referring to FIG. 17 (*c*), a menu window 1740 for confirming a password for the lock attribute is displayed. If a password is correctly inputted, referring to FIG. 17 (*d*), the lock attribute given to the message icon 1710 can be removed or released. In doing so, due to the removal or release of the lock attribute, the outline 1725 corresponding to the lock attribute disappears around the message icon 1710 as well.

Optionally, the given attribute can be removed or released in a manner of manipulating a setting menu of the application corresponding to an attribute-given icon.

In addition to or instead of the features described above relative to FIGS. 15-17, it is possible to temporarily deactivate and reactivate a function or attribute transferred to an icon. For example, it is possible to perform a first function relative to an attribute-given icon as a result of transferring the attribute of the attribute-giving icon to the attribute-given icon. It is also possible to perform a second function relative the attribute-given icon in response to a subsequent touch input to the attribute-giving icon or another a predetermined icon that is not the attribute-given icon. The first function may be one of hiding the attribute-given icon, displaying a preview of the attribute-given icon, activating the attribute-given icon, and locking the attribute-given icon. The second function may be one of unhiding the attribute-given icon, removing the preview of the attribute-given icon, deactivating the attribute-given icon, and unlocking the attribute-given icon.

In one embodiment, the second function may remain in effect until the device is powered off, with the first function being reactivated after the device is later powered on. In another embodiment, the second function may remain in effect while the device is in an active mode, with the first function being reactivated after the device emerges from a sleep mode. In another embodiment, the second function may remain in effect only for a predetermined time, which may be factory set or user set. In another embodiment, the second function may remain in effect while affected icons are displayed with the first function being reactivated after the device changes display modes. Other embodiments may be envisioned.

Also, a variety of touch input schemes may be used to deactivate/reactivate the attribute transferred to the attribute-given icon from the attribute-giving icon. For example, the attribute may be deactivated in response to a long touch, a double touch or another touch to the attribute-giving icon, or another icon other than the attribute-given icon. Other touch input schemes may be envisioned. Alternatively, the deactivation/reactivation of the attribute may be performed based on one or more touches to the background of the display or via inputs via a mechanical input device such as a button, toggle, etc.

Also, as previously discussed, an attribute-given icon may be displayed such that it is apparent that an attribute has been given to the icon. When the attribute is temporarily deactivated as discussed above, an attribute-given icon may be displayed such that it is apparent that an attribute has been given to the icon but the attribute is deactivated. For example, an icon may be displayed as shown in FIG. 7(d) to indicate that the icon is locked. However, upon deactivating the attribute, the icon may be shown as in FIG. 7(d) but with a shading or other secondary display characteristic to indicate that the lock attribute is deactivated. Other types of distinguishing display characteristics may be envisioned.

According to the aforesaid embodiments of the present invention, a menu tree structure, a menu depth, a menu type or form, a pattern of a touch input for selecting/dragging an icon, an icon shape and the like are just exemplary, by which the present invention is non-limited. And, the present invention is applicable to user interfaces of various shapes or types in a manner of being modified.

According to the aforesaid embodiments of the present invention, a touch action performed using a pointer can be replaced by a command input performed using a cursor manipulated via a navigation key or a corresponding key button.

Moreover, according to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example.

The aforementioned embodiments of the mobile terminal having the user interface using the attribute-giving icon are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a touch screen configured to receive a touch input command from a user; and
a controller configured to:
display a first icon together with a second icon on a home screen of the touch screen, the first icon being an attribute-giving icon, and the second icon being an application icon or a widget, such that the first icon is generated on the home screen after the second icon is displayed on the home screen,
display an attribute icon on or with the second icon to indicate that an attribute of the first icon displayed on the home screen is applied to the second icon displayed on the home screen, in response to a first touch input received via the touch screen, wherein the first touch input is to bring the first icon and the second icon into contact with each other, and
determine whether or not the first icon disappears after the attribute of the first icon is applied to the second icon in response to the first touch input, depending on a duration of the contact between the first icon and the second icon,
wherein the controller is further configured to:
in response to transferring a plurality of attributes to the second icon, display the second icon together with relevant attribute icons corresponding to the plurality of attributes, and
in response to a single predetermined touch input received via the touch screen, remove all of the plurality of attributes from the second icon such that the second icon is displayed without the relevant attribute icons corresponding to the plurality of attributes,
wherein the attribute applied to the second icon relates to executing an application associated with the second icon, and
wherein whether or not the first icon disappears is determined such that the first icon disappears after the attribute of the first icon is applied to the second icon if the duration of the contact between the first icon and the second icon is less than a predetermined time, and the first icon does not disappear after the attribute of the first icon is applied to the second icon if the duration of the contact between the first icon and the second icon is equal to or longer than the predetermined time.

2. The mobile terminal of claim 1, wherein the relevant attribute icons indicate that the plurality of attributes have been applied to the second icon.

3. The mobile terminal of claim 1,
wherein the controller is configured to perform a first function relative to the second icon as a result of applying the attribute of the first icon to the second icon, and
wherein the controller is configured to perform a second function relative to the second icon in response to a subsequent touch input to the first icon or another icon different from the second icon.

4. The mobile terminal of claim 3,
wherein the first function is one of hiding the second icon, displaying a preview of the second icon, activating the second icon, and locking the second icon, and
wherein the second function is one of unhiding the second icon, removing the preview of the second icon, deactivating the second icon, and unlocking the second icon.

5. The mobile terminal of claim 1, wherein, after the attribute of the first icon is applied to the second icon, the controller is configured to control an operation of the second icon in response to a second touch input received on the first icon or another icon different from the second icon.

6. The mobile terminal of claim 5, wherein the operation of the second icon is one of a deactivation and a reactivation of the attribute of the first icon that was applied to the second icon.

7. The mobile terminal of claim 6,
wherein the controller is configured to change a display characteristic of the second icon after the attribute of the first icon is applied to the second icon, and
wherein the controller is configured to change another display characteristic of the second icon to indicate that the attribute of the first icon that was applied to the second icon has changed between an active state and an inactive state.

8. The mobile terminal of claim 1, wherein, in response to a second touch input to a predetermined icon, the controller is configured to display a list of icons to which the attribute of the first icon has been applied.

9. The mobile terminal of claim 1, wherein the controller is configured to generate and display the first icon on the home screen in response to a second touch input received via the touch screen.

10. The mobile terminal of claim 9, wherein the second touch input includes a user touch to an icon-generation icon displayed on the home screen, followed by a user touch for selecting one of the plurality of attributes displayed in response to the user touch to the icon-generation icon.

11. The mobile terminal of claim 9, wherein the second touch input includes a user touch to a background display of the home screen, followed by a user touch for selecting one of the plurality of attributes displayed in response to the user touch to the background display.

12. A method of controlling a display of a mobile terminal having a touch screen and a controller, the method comprising:
displaying a first icon together with a second icon on a home screen of the touch screen, the first icon being an attribute-giving icon, and the second icon being an application icon or a widget, such that the first icon is generated on the home screen after the second icon is displayed on the home screen;
displaying an attribute icon on or with the second icon to indicate that an attribute of the first icon displayed on the home screen is applied to the second icon displayed on the home screen in response to a first touch input received via the touch screen, wherein the first touch input is to bring the first icon and the second icon into contact with each other; and
determining whether or not the first icon disappears after the attribute of the first icon is applied to the second icon in response to the first touch input, depending on a duration of the contact between the first icon and the second icon,
wherein the method further comprises:
in response to transferring a plurality of attributes to the second icon, displaying the second icon together with relevant attribute icons corresponding to the plurality of attributes; and
in response to a single predetermined touch input received via the touch screen, removing all of the plurality of attributes from the second icon such that the second icon is displayed without the relevant attribute icons corresponding to the plurality of attributes,
wherein the attribute applied to the second icon relates to executing an application associated with the second icon, and
wherein whether or not the first icon disappears is determined such that the first icon disappears after the attribute of the first icon is applied to the second icon if the duration of the contact between the first icon and the second icon is less than a predetermined time, and the first icon does not disappear after the attribute of the first icon is applied to the second icon if the duration of the contact between the first icon and the second icon is equal to or longer than the predetermined time.

13. The method of claim 12, wherein the relevant attribute icons indicate that the plurality of attributes have been applied to the second icon.

14. The method of claim 12, further comprising:
performing a first function relative to the second icon as a result of applying the attribute of the first icon to the second icon; and
performing a second function relative to the second icon in response to a subsequent touch input to the first icon or another icon different from the second icon.

15. The method of claim 14,
wherein the first function is one of hiding the second icon, displaying a preview of the second icon, activating the second icon, and locking the second icon, and
wherein the second function is one of unhiding the second icon, removing the preview of the second icon, deactivating the second icon, and unlocking the second icon.

16. The method of claim 12, further comprising:
after the attribute of the first icon is applied to the second icon, controlling an operation of the second icon in response to a second touch input received on the first icon or another icon different from the second icon.

17. The method of claim 16, wherein the operation of the second icon is one of a deactivation and a reactivation of the attribute of the first icon that was applied to the second icon.

18. The method of claim 17, further comprising:
changing a display characteristic of the second icon after the attribute of the first icon is applied to the second icon; and
changing another display characteristic of the second icon to indicate that the attribute of the first icon that was applied to the second icon has changed between an active state and an inactive state.

19. The method of claim 12, further comprising:
displaying a list of icons to which the attribute of the first icon has been applied in response to a second touch input to a predetermined icon.

20. The method of claim 12, further comprising:
generating and displaying the first icon on the home screen in response to a second touch input received via the touch screen.

21. The method of claim 20, wherein the second touch input includes a user touch to an icon-generation icon displayed on the home screen, followed by a user touch for selecting one of the plurality of attributes displayed in response to the user touch to the icon-generation icon.

22. The method of claim 20, wherein the second touch input includes a user touch to a background display of the home screen, followed by a user touch for selecting one of the plurality of attributes displayed in response to the user touch to the background display.

\* \* \* \* \*